United States Patent [19]

Miwa et al.

[11] 4,188,566

[45] Feb. 12, 1980

[54] METHOD FOR DETECTING COORDINATES OF GAS DISCHARGE PANELS AND APPARATUS FOR CARRYING OUT THE SAME

[75] Inventors: Hirohide Miwa; Toshiaki Terakawa, both of Kawasaki, Japan

[73] Assignee: Fujitsu Limited, Japan

[21] Appl. No.: 862,499

[22] Filed: Dec. 20, 1977

[30] Foreign Application Priority Data

Dec. 22, 1976 [JP] Japan .................................. 51-154702

[51] Int. Cl.$^2$ ..................... H05B 37/00; H05B 39/00; H05B 41/00
[52] U.S. Cl. .................................. 315/169.4; 340/707
[58] Field of Search .................... 315/169 R, 169 TV; 340/324 M

[56] References Cited

U.S. PATENT DOCUMENTS 3,875,472   4/1975   Schermerhorn .............. 315/169 TV Primary Examiner—Alfred E. Smith
Assistant Examiner—Robert E. Wise
Attorney, Agent, or Firm—Staas & Halsey

[57] ABSTRACT

A method and an apparatus for determining coordinates in a self-shift type gas discharge panel by means of a light pen, the panel comprising a group of X electrodes connected in common at periodic intervals and a group of Y electrodes crossing said X electrodes. The Y electrodes comprise display Y electrodes and scanning Y electrodes, and detection with the light pen is performed by shifting discharge spots along the scanning Y electrodes by shift pulses applied to the X electrodes.

12 Claims, 10 Drawing Figures

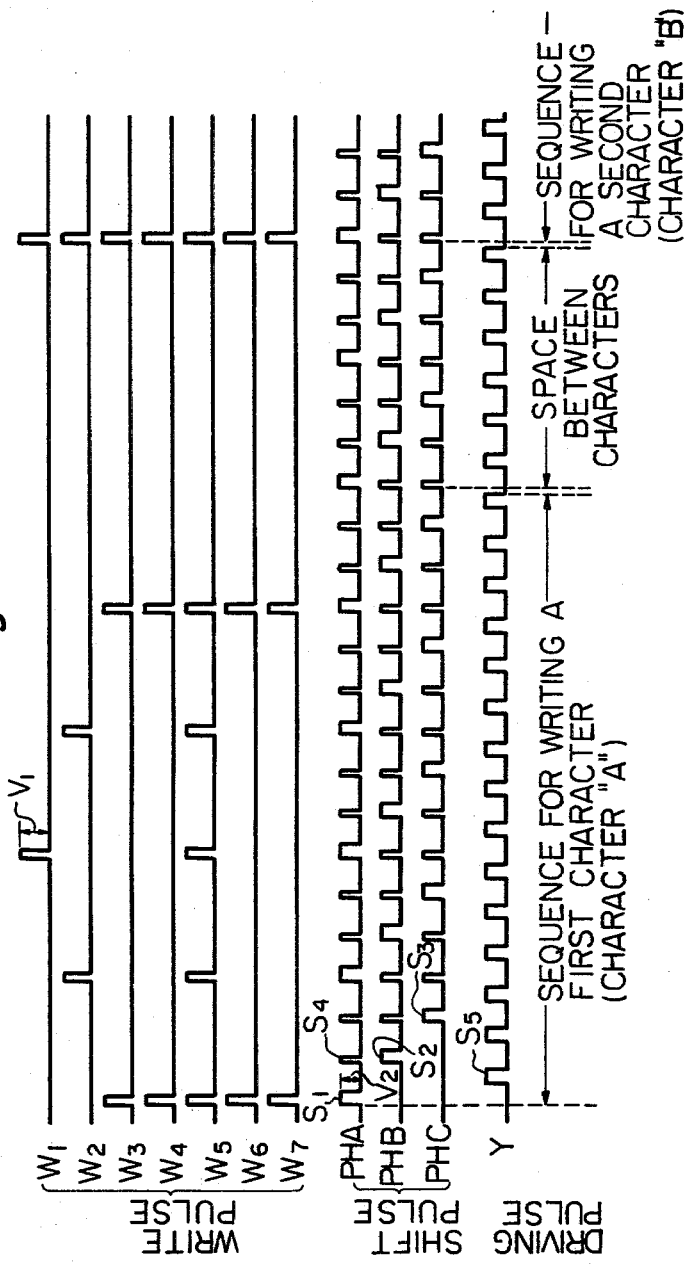

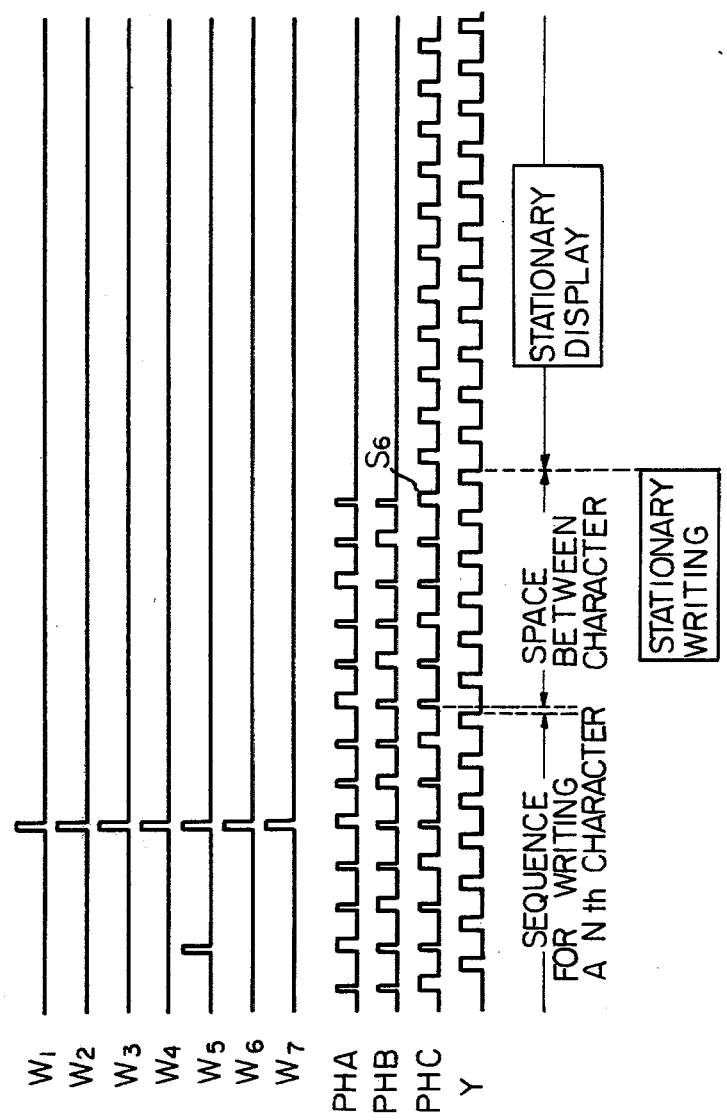

| Fig. 5A | Fig. 5B |

| Fig. 7A | Fig. 7B |

METHOD FOR DETECTING COORDINATES OF GAS DISCHARGE PANELS AND APPARATUS FOR CARRYING OUT THE SAME

BACKGROUND OF THE INVENTION

1. Field of the Invention

The present invention relates to a method and an apparatus of detecting coordinates in a gas discharge panel.

2. Description of the Prior Art

Conventionally, the dot matrix type display device, called the plasma display panel, is known in the art as a display device utilizing gas discharge. The conventional plasma display panel is described in various publications, for example, U.S. Pat. No. 3,499,167, entitled "Gas Discharge Display Memory Device and Method of Operating", by Baker et al, and U.S. Pat. No. 3,559,190, entitled "Gaseous Display and Memory Apparatus", by Bitzer et al. Such a plasma display panel comprises a gaseous cell filled with gas capable of ionization, and arrays of X and Y electrodes arranged and connected in matrix form so as to provide many "elemental discharge areas" in the gaseous cell. Further the major characteristic feature is to provide a memory function due to wall charges. However, in spite of this characteristic feature the circuit for driving this plasma display panel requires one address circuit for each X and Y electrode. As these address circuits are required to scan in order, the peripheral circuit of this plasma display panel becomes very complex and expensive. In this connection, the conventional plasma display panel is somewhat disadvantageous compared with other devices such as cathode ray tube display devices.

Another display device utilizing gas discharge provides a self scanning device as a means for resolving the above-mentioned inconveniences of the peripheral circuit. The trademark name of the device is "Self Scan". This kind of display device as mentioned, for example, in *ELECTRONICS* (in U.S.A.), Vol. 43, No. 5, P120-P125, comprises double construction of the scanning part and display part. Discharge sports are moved along each line of the scanning part on the rear face used as an exciting source. The discharge spots are scanned and selectively taken to the display part on the front face, in accordance with the position of said discharge spot, and thereby the display action is carried out.

However, the above-mentioned type of the display device utilizing gas discharge has some other disadvantages. That is, the construction of a wall for separating the scanning part and the display part, and the construction of the electrodes, is complicated and not suited to mass production. Also the life of each electrode exposed directly to the gaseous cell is short, and an external memory for refreshing is necessary. Further the brightness of the display part decreases as the number of picture elements increases.

Still another display device, which is called a "self shift type plasma display panel", is disclosed in U.S. Pat. No. 3,944,875, entitled "Gas Discharge Device Having a Function of Shifting Discharge Spots", by OWAKI et al. Such a self shift type plasma display panel comprises a gaseous cell filed with gas capable of ionization, at least one row of electrodes, and a plurality of column electrodes positioned in such a manner that they cross the row of electrodes. In this self shift type plasma display panel, the elemental discharge areas are arranged sufficiently close together that adjacent elemental discharge areas affect each other in the direction of the shift of the discharge spot by the primary current effect.

As used herein, the term "elemental discharge area" means the minimum area which can be fired in the gaseous cell. The minimum area is positioned between the cross points of row and column electrodes, or between adjacent electrodes. The term "primary current effect" means an excitation generated in one elemental discharge area by firing an adjacent one.

The self shift type plasma display panel mentioned above has a construction in which a plurality of electrodes crossing the direction of shifting of the discharge spot are connected periodically to common buses and each common bus is respectively connected to a sustaining signal source having a predetermined phase. In this gas discharge panel, a voltage higher than the discharge initiating voltage is applied between the row electrodes and the column electrodes to generate discharge spots, and the discharge spots on the display device can be shifted by using the primary current effect. Consequently a desired display pattern having discharge spots can be obtained.

Display patterns generated in the above mentioned self shift plasma display panel can be used for various displays. When this gas discharge display is used, for example as a display of a computer system, it is necessary to use a man-machine interface enabling an operator to have conversations with the computer through the gas discharge panel. In order to realize this man-machine interface, it is first of all indispensable that information of the coordinate position on the gas discharge panel designated by the operator should be converted to some electrical signal.

A selected letter or item displayed on the gas discharge panel can be identified by this coordinate position information. In an ordinary display device, a light pen is used for designation of the detected point, and a method of detecting scanned light spots is customarily adopted. When this conventional means is applied to the gas discharge panel, the intended object can be attained by moving a scanning discharge spot along a predetermined route, along a large number of discharge cells arranged with high density in a matrix pattern, by obtaining information of the coordinates (X, Y) as an electric signal at the position where the light pen detects this scanning discharge spot. In this case, however, disadvantages are caused. For example, since the scanning discharge spot is superposed on the display pattern already being shown, this is caused to disappear and erroneous lighting takes place.

SUMMARY OF THE INVENTION

It is an object of the present invention to provide a method and an apparatus for detecting coordinates of a gas discharge display panel in which the above mentioned disadvantages are eliminated.

It is another object of the present invention to provide a method and an apparatus for detecting coordinates of a gas discharge display panel disclosed in U.S. Pat. No. 3,944,875, in which the Y electrodes comprise display Y electrodes and scanning Y electrodes, and the detection by the light pen is performed by shifting discharge spots along the scanning Y electrodes by shift pulses applied to the X electrodes.

It is still another object of the present invention to provide a method and an apparatus for detecting coordinates in a gas discharge display panel having a plurality of scanning Y electrodes, in which the scanning Y electrodes are selectively scanned with discharge spots and, after the Y coordinate position is detected, a discharge spot is shifted along the corresponding scanning Y electrode.

It is a further object of the present invention to provide a method and an apparatus for detecting coordinates in a gas discharge display panel in which the application of sustaining pulses to the displaying Y electrodes is stopped while the discharge spots are shifted along the scanning Y electrodes.

It is a still further object of the present invention to provide a method and an apparatus for detecting coordinates of a gas discharge display panel in which pulses are supplied to the displaying Y electrodes every time the position of the discharge spot being shifted along the scanning Y electrodes coincides with the ones of the X electrodes to which the sustaining pulses are supplied.

In accordance with the present invention, the above-mentioned objects can be attained by a method for detecting with a light pen the coordinates of display points defined between a group of X electrode and a group of Y electrode crossing the X electrode, the method being characterized in that Y electrodes are utilized as display Y electrodes and scanning Y electrodes, and detection by the light pen is performed by shifting discharge spots along the scanning Y electrodes by shift pulses applied to a group of X electrodes while stopping application of sustaining pulses to the display Y electrodes.

In accordance with the present invention, the above-mentioned objects can be attained by an apparatus for detecting a coordinate position in a self shift type gas discharge display panel comprising: a gas discharge display panel which provides a group of X electrodes and a plurality of Y electrodes crossed with said group of X electrodes via a gap filled with gas, said group of X electrodes being composed of a plurality of sub-groups, pulses having the same phase being applied to all X electrodes in each sub-group, and said group of Y electrodes being composed of displaying Y electrodes and scanning Y electrodes; sustaining pulse supplying means for supplying sustaining pulses to one subgroup of said group of sid X electrodes and to said displaying Y electrodes so as to maintain predetermined information for display; shift pulse supplying means which stops the application of said sustaining pulses and which supplies pulses having a different phase to each said subgroup of said X electrodes, and which supplies shift auxiliary pulses synchronized with the shift pulses to said scanning Y electrode, thereby shifting a discharge spot along said scanning Y electrode of said self shift type gas discharge display panel; counter means for counting the number of clock signals corresponding to said shift pulses and for generating information concerning the position of said discharge spot; a light pen which is contacted with a surface of said self shift type gas discharge display panel and which detects the discharge spot which is caused beneath the contact point with the surface and between one electrode of said X electrodes and one of said scanning Y electrodes; and; driving means for stopping the clock pulse signal to said counter means and for supplying said sustaining pulses to said displaying Y electrodes by the detected output of said light pen.

Further features and advantages of the present invention will be apparent from the ensuing description with reference to the accompanying drawings. Other modifications and variations would be obvious to one skilled in the art.

BRIEF DESCRIPTION OF THE DRAWINGS

FIG. 3 is a time chart of the writing step of the self-shift type gas discharge panel shown in FIG. 1;

FIG. 4 is a time chart of the stationary display step of the self-shift type gas discharge panel shown in FIG. 1;

DESCRIPTION OF THE PREFERRED EMBODIMENTS

Figure 1:
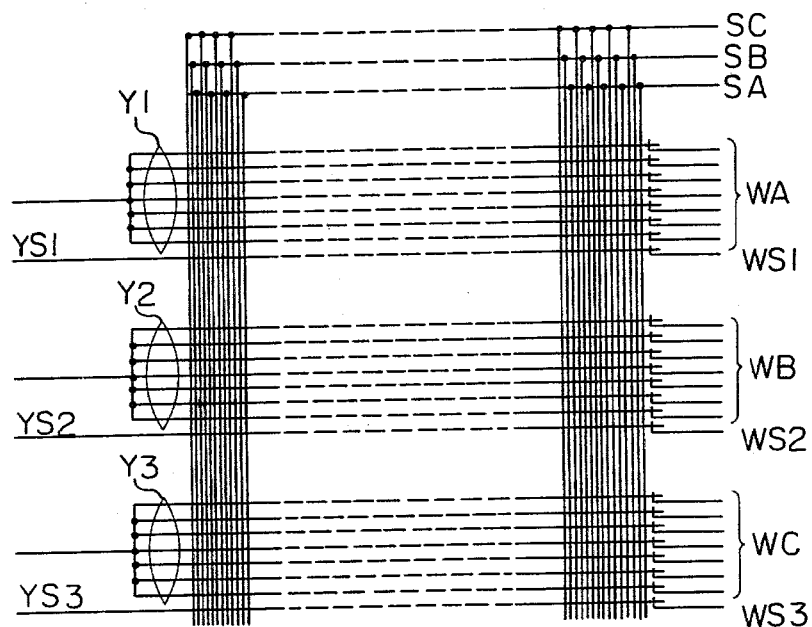
FIG. 1 is a front view of a self-shift type gas discharge panel according to the present invention.
Figure 2:
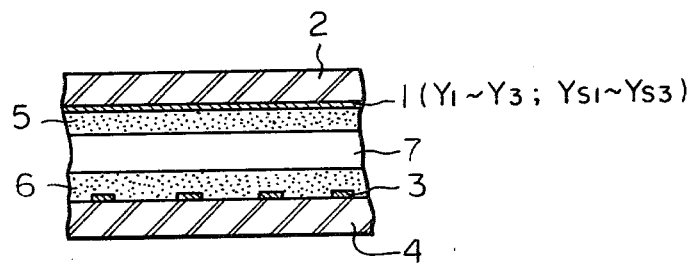
FIG. 2 is a partial sectional view of the self-shift type gas discharge panel shown in FIG. 1.

In FIG. 1 are shown shift electrodes SA through SC write electrodes WA through WC and WS1 through WS3 groups of displaying Y electrodes Y1 through Y3, and scanning electrodes YS1 through YS3. In FIG. 2 are shown a group of Y electrodes 1 arranged on a first glass substrate 2, a group of X electrodes 3 arranged on a second glass substrate 4, dielectric layers 5 and 6 coated on the groups of X and Y electrodes, respectively, and a gas discharge space 7. As is well known in the art, the self-shift panel comprises the X electrodes 3 connected in common at intervals of n electrodes and crossing the Y electrodes 1, and write electrodes mounted on the second glass substrate 4.

More specifically, as shown in FIG. 1, the X electrodes 3 are connected to the corresponding shift electrodes SA, SB and SC. For example, the first, fourth, . . . (3n−2)-th electrodes 3 of the group X counted from the right are connected to the shift electrode SA, the second, fifth, . . . (3n−1)-th electrodes 3 of the group X are connected to the shift electrode SB, and the third, sixth, . . . (3n)-th electrodes 3 of the group X are connected to the shift electrode SC. The write electrodes WA to WC are mounted so as to correspond to the respective Y electrodes 1.

When a write discharge cell is selected between the write electrodes WA to WC and Y electrodes, a discharge spot is selectively generated. This discharge spot is shifted to the left in FIG. 1, along the Y electrodes, by shift pulses supplied to the shift electrodes SA to SC. In order to stop the shifting and make the discharge spot stationary for display, the discharge is held by applying sustaining pulses betwen the shift electrodes (namely, and X electrodes) and the Y electrodes.

FIGS. 3 and 4 are diagrams illustrating the method for driving the self-shift panel. More specifically, FIG. 3 is a time chart of the writing step and FIG. 4 is a time chart of the stationary display step.

For explaining the illustrations, the driving of one line including operation of the write electrodes WA and the electrode Y1 of the group of Y electrodes will be described. Assuming that the write electrodes WA include seven elementary electrodes, writing of the letter "A" in 5×7 cells will now be described.

Write pulses identified by W1 to W7 are applied to the seven write electrodes WA, respectively. At the time of application of the write pulses, the electrode Y1 of the group of Y electrodes is maintained at 0 volts. Accordingly, it is necessary that the voltage V1 of the write pulses should be high enough to generate a discharge spot between the write electrode and the Y electrode (namely, the voltage V1 should be higher than the discharge initiating voltage). Simultaneously with application of the write pulses, a shift pulse S1 is applied to the shift electrode SA. The voltage V2 of the shift pulse S1 is controlled so as to be below the discharge initiating voltage but is maintained at a level sufficient to generate a discharge spot by an adjacent discharge effect described hereinafter.

When the shift pulse S1 is applied to the shift electrode SA, the shift pulse S1 is applied to all the (3n−2)-th electrodes of the group of X electrodes connected to the shift electrode SA. In general, in the case where a discharge is generated at a crossing point adjacent to a certain crossing point, said certain crossing point is influenced by ions and the like in the discharge, and there is caused a so-called adjacent discharge effect in that the discharge initiating voltage at this certain crossing point is reduced. Accordingly, even if the shift pulse S1 is applied to all the (3n−2)-th electrodes of the goup X, the discharge spot is generated only on the first electrode of the group X adjacent to the write electrode.

Then, a shift pulse S2 is applied to the shift electrode SB and a discharge spot is generated on the second electrode of the group of X electrodes by the adjacent discharge effect of the first electrode of the group of X electrodes. Simultaneously, an erasing pulse is applied to the shift electrode SA to erase the discharge spot on the first electrode of the group X. The erasing pulse is a pulse having a narrow pulse width and, on application of this pulse, the voltage of this pulse is overlapped on the wall voltage maintained by a sustaining pulse S5 of the Y electrodes and discharge is caused temporarily. However, since the pulse width is narrow, no wall voltage can be formed and the discharge spot is extinguished.

In the foregoing described manner, the discharge spot written by the write electrode WA is gradually shifted by shift pulses applied to the shift electrodes SA to SC.

In the mode of the stationary display, as shown in FIG. 4, after application of the shift pulse S6 of the shift electrode SC, a sustaining pulse is applied to the shift electrode SC. The sustaining pulse has the same width and height as the shift pulse but its frequency is three times of the frequency of the shift pulse, neglecting the erase pulses of the latter. At this point, no pulse is applied to the shift electrode SA or SB. Accordingly, the discharge is maintained between the electrode of the group of X electrodes connected to the shift electrode SC and the electrode of the group of Y electrodes to which the sustaining pulse is applied. In this manner, the stationary display is accomplished.

The detecting operation of the light pen will now be described.

Figures 5, 5A:
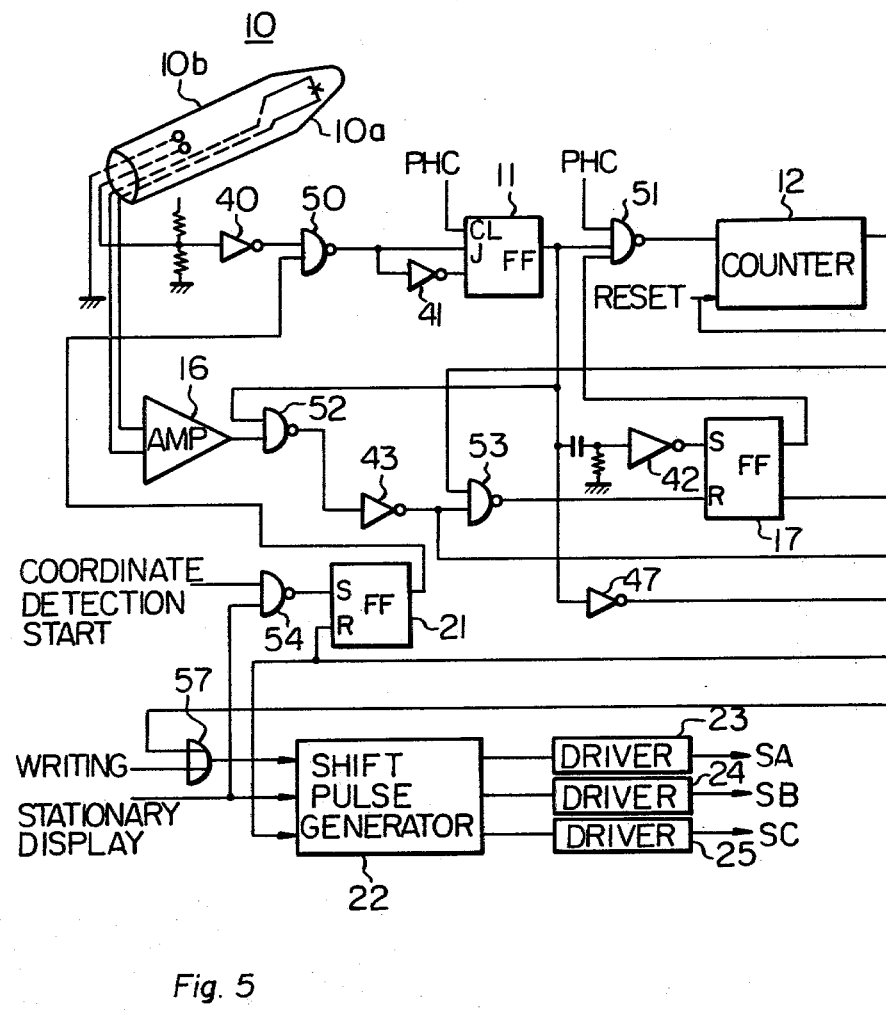
FIGS. 5A and B are block diagrams illustrating one embodiment of the present invention.
Figure 6:
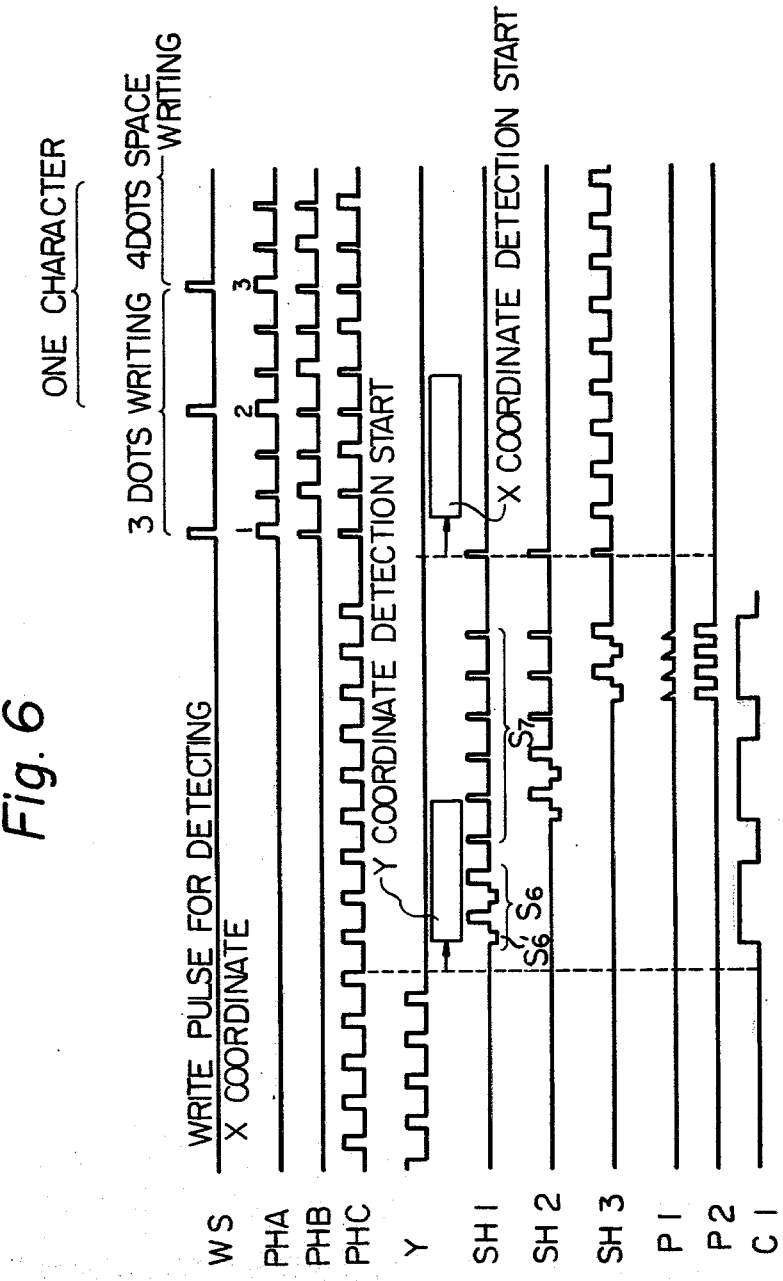
FIG. 6 is a diagram illustrating wave forms at the respective parts in the embodiment shown in FIGS. 5A and 5B.

FIGS. 5A and B are block diagrams illustrating one embodiment of the present invention and FIG. 6 is a waveform diagram illustrating the detecting operation of the light pen.

In FIGS. 5A and B are shown a light pen 10, a light detector 10a, a pen-actuating switch 10b, a flip-flop 11, a ternary counter 12, a sexadecimal counter 13, a decoder 14 and driver circuits for scanning electrodes 15-1 to 15-N, an amplifier 16, flip-flops 17 and 18, a ring counter 19 and a counter 20, a flip-flop 21, a shift pulse generating circuit 22, driver circuits 23, 24 and 25 for the shift electrodes, and a sustaining pulse generating circuit 26, a write pulse generating circuit 30, a write driver 31, a driver circuit 32, inverters 40 to 47, "nand" gates 50 to 56 and 59-1 to 59-N, an or gate 57 and an "and" gate 58.

When an operator depresses a coordinate-detecting key, if the panel is in the stationary display mode, the gate 54 is opened and the flip-flop 21 of the "0" set type is set. When the flip-flop 21 is set, detection of the coordinates is possible. The gate 54 is disposed so as to inhibit detection of the coordinates in the write mode, namely not in the stationary display mode.

On the setting of the flip-flop 21, the gate 50 is opened. At this point, if the switch 10b of the light pen 10 is depressed, the output of the inverter 40 becomes "1", and an output of "0" is put out from the gate 50 to set the flip-flop 11 of the "0" set type at a timing of a C-phase shift pulse PHC. In short, the coordinate-detecting mode is initiated. The rising of the set output of the flip-flop 11 is detected by a differentiating circuit including a condenser and a resistance to set the flip-flop 17 of the "0" set type through the inverter 42. Simultaneously, the gate 58 is closed through the inverter 47 to stop application from the sustaining pulse of the substaining pulse generating circuit 26 to the electrodes Y1, Y2 and Y3 of the group of Y electrodes (see the signal Y in FIG. 6). The output of the flip-flop 11 opens the gate 52 and the output from the amplifier 16 is applied to the flip-flop 17.

Since the set outputs of the flip-flops 11 and 17 are applied to the gate 51, the C-phase shift pulse PHC is put in the ternary counter 12. Every time the ternary counter 12 counts three C-phase shift pulses, the sexadecimal counter 13 is advanced incrementally.

The sexadecimal counter 13 selects in sequence the scanning electrodes YS1 to YSN and it can select sixteen scanning electrodes. In the embodiment illustrated in FIG. 1, N is equal to 3, and a ternary counter may be used instead of the sexadecimal counter 13.

The output of the sexadecimal counter 13 is decoded by the decoder 14 and is converted to a signal for selecting any of the scanning electrodes YS1 to YSN. This selecting signal is passed through the gates 59-1, 59-2, . . . 59-N by the output of the ternary counter 12 and is applied to the scanning electrode driver circuits 15-1 to 15-N. Each of scanning electrode driver circuits 15-1 to 15-N comprises a write signal generating circuit 15-1a, 15-2a, . . . or 15-Na generating a write signal S6, shown in FIG. 6, according to the falling of the output of the gate 59-1, 59-2, . . . or 59-N, and an erasing pulse generating circuit 15-1b, 15-2b, . . . or 15-Nb generating an erasing pulse S7, shown in FIG. 6, according to rising of the output of the gate 59-1, 59-2, . . . or 59-N.

According to the output from the gate 59-1, the scanning electrode driver circuit 15-1 applies a signal SH1, shown in FIG. 6, to the scanning electrode YS1. Accordingly, discharge is caused at all the crossing points of the scanning electrode YS1 with the X electrodes connected to the shift electrode. SC because the superposition shown in FIG. 6, of the component S$_6'$ of the signal SH1 applied to the scanning electrode YS1 with the signal PHC applied to the C phase X electrode, exceeds the firing voltage at every third discharge point of the selected scanning Y electrode.

In the above-mentioned manner, discharge is caused in sequence on the scanning electrodes YS1, YS2 and YS3 according to the output of the decoder 14.

When the light detector 10a of the light pen 10 detects the light of the scanning electrode YS3 as P1, shown in FIG. 6, an output P2 shown in FIG. 6 is caused to appear from the amplifier 16. Since the gate 52 is opened by the output of the flip-flop 11, this output is applied to the inverter 43 to reset the flip-flop 17 through the gate 53 actuated by the output (C1 in FIG. 6) of the ternary counter 12. By this resetting of the flip-flop 17, the gate 51 is closed, and the values counted at this point are maintained in the ternary counter 12 and the sexadecimal counter 13. This counted value of the sexadecimal counter 13 corresponds to the Y coordinates of the light pen 10. Thus, by resetting of the flip-flop 17, detection of the Y coordinates is completed, and detection of the X coordinate is then initiated.

More specifically, the rising point of the flip-flop 17 is differentiated and detected by the differentiating circuit, and the flip-flop 18 is set through the inverter 44. The erasing pulse generating circuits of the scanning electrode driver circuits of the scanning electrode driver circuits 15-1 to 15-N are reset by the output of the flip-flop 18 to stop application of the signals of the scanning electrodes YS1 to YSN. Simultaneously, write mode instructions are applied to the shift pulse generating circuit 22 through the inverter 46 or "or" gate 57 to cause the shift pulse driving circuits 23, 24 and 25 to apply shift pulses PHA, PHB and PHC, shown in FIG. 6, to the shift electrodes SA, SB and SC, respectively. The set output of the flip-flop 18 opens the gate 56 and the C-phase shift pulse PHC is applied to the heptal ring counter 19. Outputs of the terminals 1, 2 and 3 of the heptal ring counter 19 are applied to the write pulse generating circuit 30 to generate a write pulse WS, shown in FIG. 6, synchronously with the C-phase shift pulses. Simultaneously, a sustaining pulse from the sustaining pulse generating circuit 26 is applied only to the scanning elerode (YS3 in FIG. 3) corresponding to the counted value maintained in the sexadecimal counter 13 by the driver circuit 32.

The write pulse WS is applied to the write electrode (WS3 in FIG. 6) corresponding to the counted value maintained in the sexadecimal counter 13 by the write driver circuit 31. Accordingly in the embodiment shown in FIG. 1, the discharge spot supplied from the write electrode WS3 is moved to the left along the scanning electrode YS3 on the third line. When the light detector 10a of the light pen 10 detects the discharge point again at this point, an output in manifested through the amplifier 16. Since the gate 55 is opened by the output from the terminal 3 of the heptal ring counter 19, the above manifested output resets the flip-flop 18 through the inverter 43. By this resetting of the flip-flop 18, the gate 56 is closed and the operation of the heptal ring counter 19 is stopped.

Since the output from the terminal 3 of the heptal ring counter 19 is input to the counter 20, every time the discharge spot is shifted by 7 dots, the counter 20 is advanced incrementally. More specifically, in the embodiment shown in FIG. 1, since one letter is expressed by 5 lateral dots and a space of 2 dots is interposed between two adjacent letters, the counted value of the counter 20 indicates the coordinates of the letter located at the position of the shifted discharge spot. Accordingly, the X coordinate of the light pen can be detected by the counter 20. The output of the gate 55 resets the flip-flop 21 through the inverter 45 and, thus, the coordinate detection mode is completed. Simultaneously, the mode of the shift pulse generating circuit 22 is returned to the stationary display mode by the output of the inverter 45.

Figure 5B:
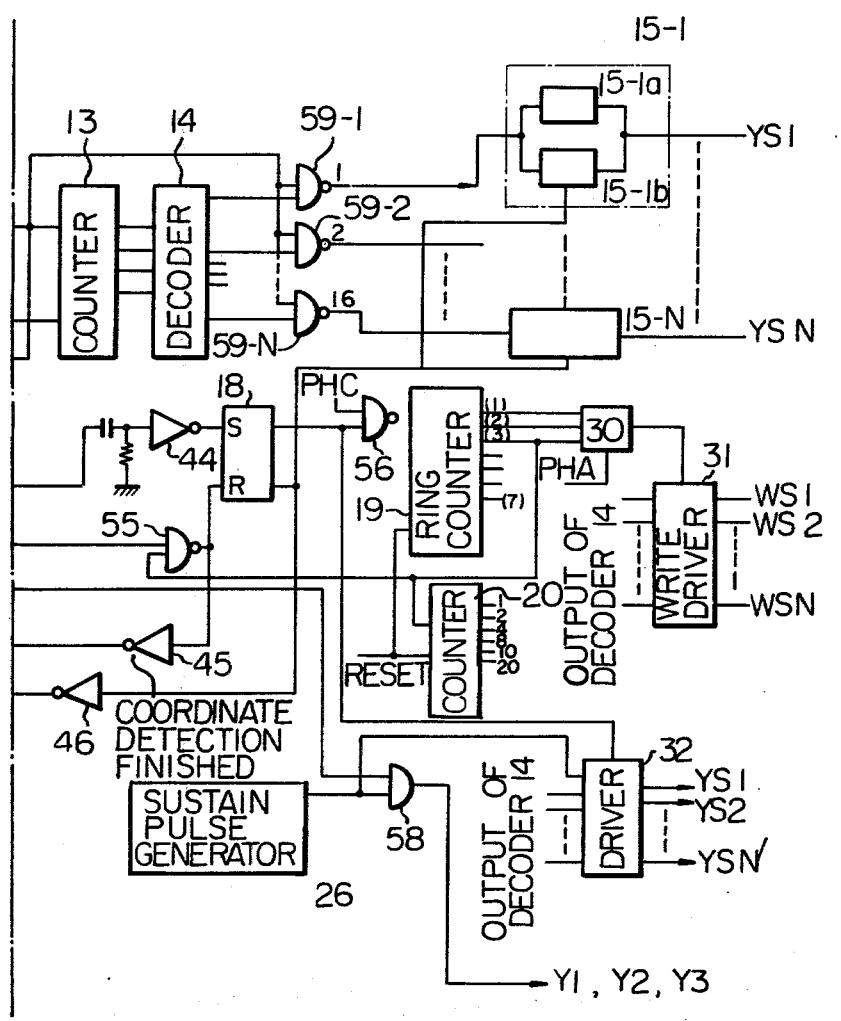

The operation in the embodiment of the present invention illustrated in FIGS. 5A, 5B and 6 is summarized as follows.

In the coordinate detection mode, the letters maintained by the discharge between the electrodes Y1 to Y3 of the group of Y electrodes and the group of X electrodes is temporarily not displayed (in other words, no sustaining pulse is applied to any of the electrodes Y1 to Y3), and during this non-display period, discharge is caused in sequence on the scanning electrodes YS1 to YS3 to detect the Y coordinates of the light pen. Then, the discharge spot scans the scanning electrode corresponding to the detected Y coordinate, and the X coordinate of the light pen is detected. After detection of the X coordinate, the sustain pulse is applied again to the electrodes Y1 to Y3 of the group of Y electrodes to maintain the discharge again. The present invention is characterized in that the discharge of the display letter is stopped temporarily and the system is driven for detection of the coordinates of the light pen.

Figures 7, 7A:
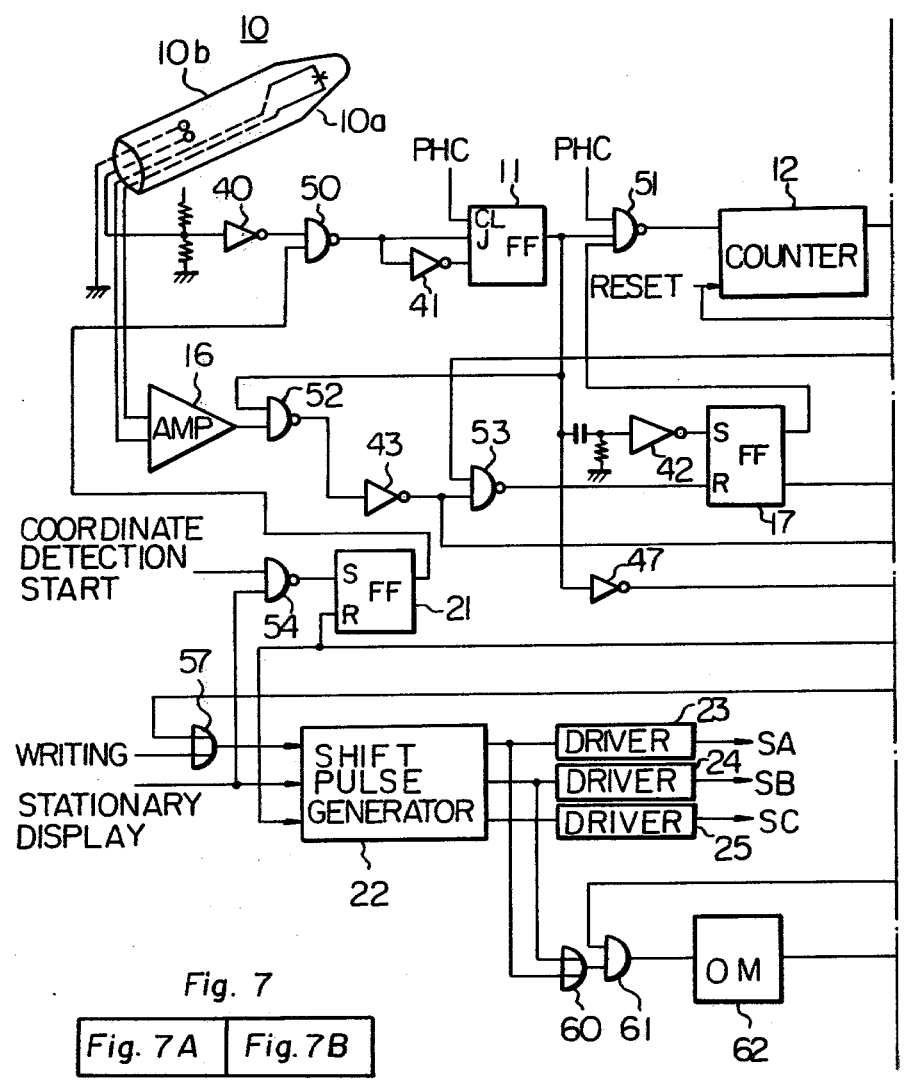
FIGS. 7A and B are block diagrams illustrating another embodiment of the present invention.
Figure 7B:
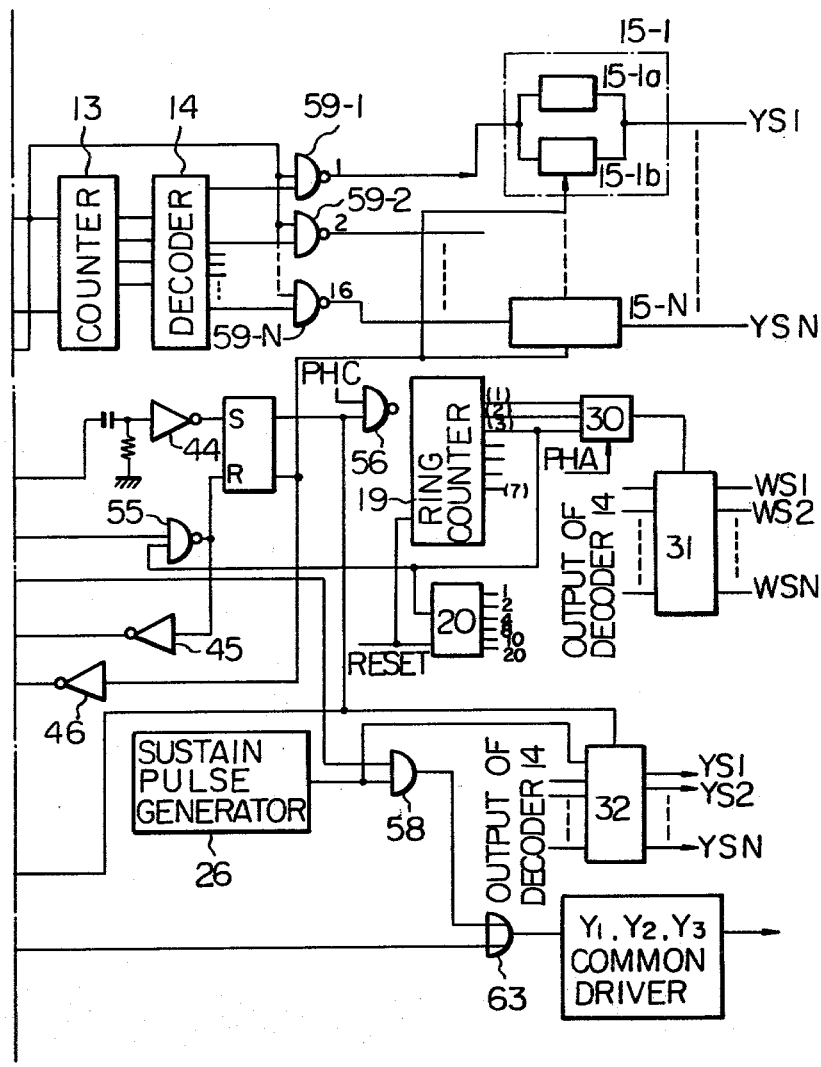

It sometimes happens that the time during which the display is stopped becomes long, because the time required for detection of an X coordinate is ordinarily longer than the time required for detection of a Y coordinate. An embodiment for shortening the time during which the display is stopped is illustrated in FIGS. 7A, 7B and 8.

Figure 8:
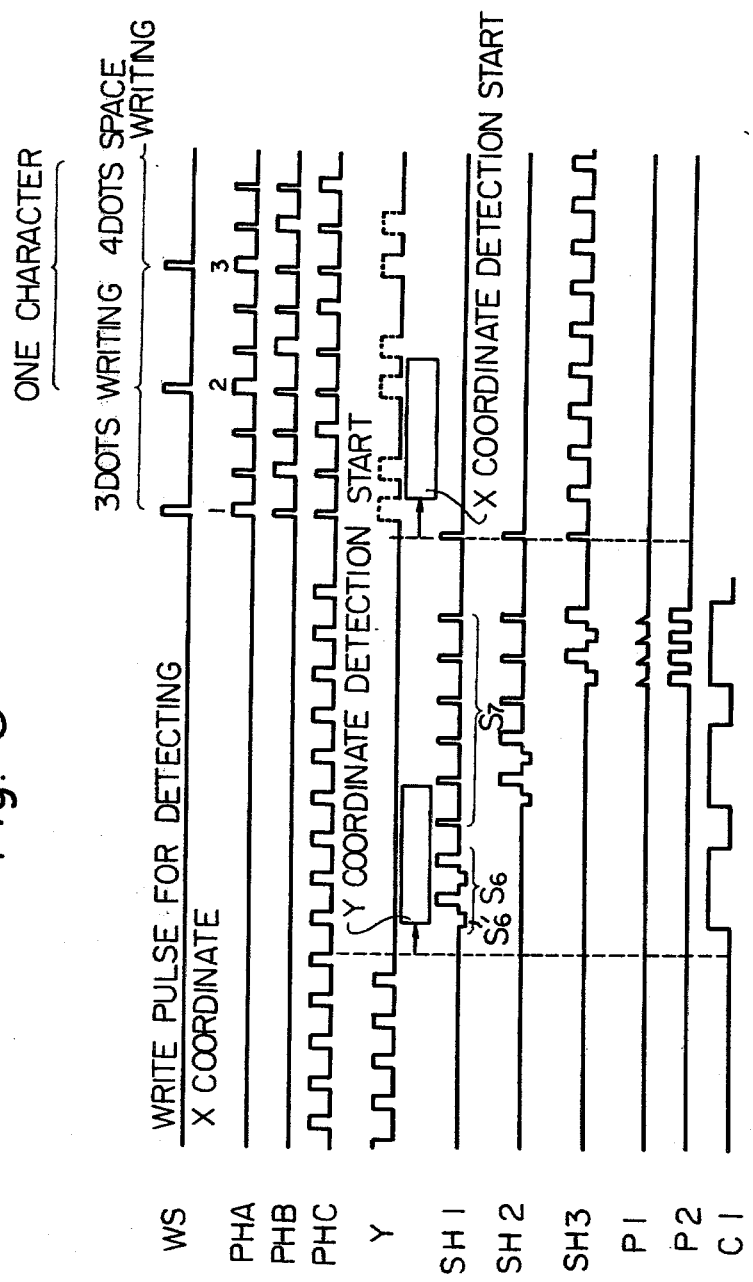
FIG. 8 is a diagram illustrating waveforms at the respective parts in the embodiment shown in FIGS. 7A and 7B.

When the flip-flop 18 is set to indicate the time for detection of an X coordinate and the shift pulse PHA or PHB is output from the circuit 22, the shift pulse drives a one-shot multi-vibrator 62 through an "or" gate 60 and an "and" gate 61 to output a signal Y having a wave form as shown in FIG. 8. This output Y is applied to the electrodes Y1, Y2 and Y3 through an "or" gate 63. Accordingly, only when the shift pulse PHC is applied to the electrode SC, is discharge caused to occur. More specifically, the data is displayed only when the discharge spot of the cursor electrode YS1 is located on the electrode SC and the time during which the display is stopped is thus shortened.

Since the wall voltage of the panel can be maintained for several hours, even if the sustaining pulse of several hundred microseconds as required for detection by the light pen is not applied, no substantial attenuation of the wall voltage is caused. Accordingly, if the sustaining pulse is applied again after detection by the light pen, the discharge is initiated again. In this case, as shown in FIG. 6, during the period of the coordinate detection mode, the C-phase shift pulse PHC is applied to the crossing points between the electrodes of the subgroups X connected to the shift electrode SC as the letter block and to the electrodes of the group Y by the shift electrode SC. In order to prevent the wall voltage from being influenced by this C-phase shift pulse PHC, it is necessary to form a wall voltage of the same polarity as that of the C-phase shift pulse PHC just before the start of the coordinate detection mode. For attaining this feature, in FIG. 6, the timing is set so that the C-phase shift pulse is applied to the above-mentioned crossing points just before the start of detection of the Y coordinates.

As will be apparent from the foregoing illustration, according to the present invention, the discharge spot for coordinate detection with the light pen can be shifted without influencing the display of letters or the like.

In the foregoing embodiments, discharge is caused at the scanning electrodes of the group Y for detecting the Y coordinate. Of course, in the present invention, the above-mentioned method for detecting the X coordinate may be applied to each one of the respective lines.

What is claimed is:

1. A method of determining the coordinates of a position in a self shift type gas discharge display panel comprising a group of X electrodes connected periodically in common to define subgroups of commonly connected ones of said X electrodes, at least one group of displaying Y electrodes and a corresponding scanning Y electrode, said Y electrodes crossing said X electrodes across a discharge gap, write electrodes crossing said Y electrodes, pulse means for selectively writing, shifting and sustaining discharge points at said crossing points between said electrodes, light pen means for designating said position whose coordinates are to be determined and for detecting discharge spots at said position, and counter means for determining information concerning the number of write and shift pulses applied prior to such detecting of discharge spots by said light pen, said method comprising:

writing, shifting and displaying information in the form of discharge spots selectively along said displaying Y electrodes by means comprising said writing electrodes crossing with said displaying Y electrodes;

bringing said light pen into sufficient proximity with one of said scanning Y electrodes for designating said position whose coordinates are to be determined, stopping said writing, shifting and displaying of said information in the form of discharge spots, firstly operating said pulse means for writing at least one discharge spot into, and shifting said discharge spot(s) along, selected sequential ones of said scanning Y electrodes from each respective one of said crossing points with said write electrode,;

detecting with said light pen said at least one discharge spot being shifted along the one of said scanning Y electrodes in proximity with said pen, firstly operating said counter means to determine the x coordinate of said position designated by said light pen from the number of said shifts along said proximate scanning Y electrode in, and recommencing said writing, shifting and displaying of said information in the form of discharge spots along said displaying Y electrodes.

2. The method of claim 1, said panel comprising a plurality of groups of said displaying Y electrodes and corresponding scanning Y electrodes, said method comprising:

secondly operating said pulse means for simultaneously writing discharge spots at selected of said crossing points between at least a selected one of said subgroups of X electrodes and sequentially selected one of said scanning Y electrodes, detecting with said light pen at least one of said simultaneously written discharge spots at said scanning Y electrode in proximity with said light pen, and secondly operating said counter means for determining the Y coordinate of said scanning Y electrode in proximity with said light pen from the number of said sequentially selected scanning Y electrodes prior to said detection of one of said simultaneously written discharge points, and selectively conducting said first operation of said pulse means for writing and shifting discharge spots only in and along said scanning Y electrode detected to be in proximity with said light pen.

3. The method of claim 1, said shifting of at least one discharged spot along said selected scanning Y electrode of said first operation of said pulse means comprising applying said shift pulses to said subgroups of X electrodes, said method comprising applying selected ones of said sustain pulses to said display Y electrodes for selectively sustaining discharge spots in said displaying Y electrodes in conjunction with said shift pulses being applied to selected ones of said subgroups of X electrodes.

4. The method of claim 3, each said group of displaying Y electrodes being connected in common with each said group, said X electrodes comprising 3 subgroups, said writing, shifting and displaying information comprising applying corresponding selective pulses in common to said commonly connected Y electrodes.

5. An apparatus for detecting the coordinates of a position designated by a light pen in a self shift type gas discharge display panel comprising:

a group of X electrodes periodically connected in common to define subgroups of commonly connected ones of said X electrodes, at least one group of displaying Y electrodes and a corresponding scanning Y electrode, said Y electrodes crossing said X electrodes across a discharge gap, write electrodes crossing said X and Y electrodes across said discharge gap, sustaining pulse means for supplying sustain pulses to at least one of said subgroups and to said at least one group of said displaying Y electrodes to maintain therein predetermined information in the form of discharge spots, stopping means for stopping the application of said sustain pulses, write pulse means for supplying write pulses selectively to said scanning Y electrodes and to said write electrodes crossed with said scanning Y electrodes for writing at least one discharge spot for shifting along at least one of said scanning Y electrode(s), shift pulse means for selectively supplying shift pulses to said scanning Y electrodes, and with different phases to each said subgroup of said X electrodes, for shifting at least one discharge spot along at least one of said scanning Y electrode(s), light pen means for designating said position in proximity with one of said scanning Y electrodes, and for detecting at least one discharge spot in said scanning Y electrode, counter means for counting the number of said shift pulses from said crossing point(s) of said write electrodes and said at least one scanning Y electrode(s) and for generating information relating to the X coordinate of said position.

6. The apparatus of claim 5 comprising means for applying sustain pulses to selected ones of said displaying Y electrodes for sustaining discharge points along selected ones of said displaying Y electrodes coincidentally with selected ones of said shift pulses being applied to said subgroups during said coordinate detection.

7. The apparatus of claim 6 comprising three of said subgroups, said sustain pulses being effectively applied to said displaying Y electrodes when said shift pulses are applied to a selected one of said subgroup.

8. The apparatus of claim 5 comprising three of said subgroups, said sustain pulses being effectively applied to said displaying Y electrodes when said shift pulses are applied to two selected ones of said subgroups.

9. The apparatus of claim 5 comprising a plurality of said groups of displaying Y electrodes and said corresponding scanning Y electrodes, said write pulse means comprising means for simultaneously writing discharge points into said crossing points of selected ones of said subgroups and a selected one of said scanning Y electrodes, and means for sequentially selecting said selected one scanning Y electrode for subsequent such simultaneous writing, said counter means comprising means for retaining information relating to said sequential selection of said scanning Y electrodes for determining the y coordinate of said designated position.

10. An apparatus for detecting the coordinates of a position in a self shift type gas discharge display panel according to claim 9 wherein said display comprises a plurality of unit characters, and each said unit character comprises an array of adjacent intersections of said crossed X and Y electrodes, and said counter means comprises:

a first counter which generates at least one output pulse every time said first counter counts the number of shift pulses corresponding to one of said unit characters, a second counter which receives the output of said first counter and which shows the position along a selected one of said scanning Y electrodes at which said predetermined unit character is positioned.

11. An apparatus for detecting the coordinates of a position in a self shift type gas discharge display panel according to claim 9, wherein said shift pulse supplying means comprises:

a "0" set flip-flop circuit which is set by the detected output of said light pen, and;

a flip-flop circuit which detects the leading edge of the output of said "0" set flip-flop circuit, which is reset by said leading edge, and which stops the application of the signal to said scanning Y electrodes by the output of said flip-flop circuit.

12. An apparatus for detecting the coordinates of a position in a self shift type gas discharge display panel according to claim 11, wherein said sustaining pulses are supplied to one group of said X electrodes and said displaying Y electrodes by the set output of said flip-flop circuit thereby displaying said predetermined information in a stationary state.

* * * * *

UNITED STATES PATENT AND TRADEMARK OFFICE
CERTIFICATE OF CORRECTION

PATENT NO. : 4,188,566
DATED : February 12, 1980
INVENTOR(S) : Hirohide Miwa et al It is certified that error appears in the above-identified patent and that said Letters Patent are hereby corrected as shown below:

Column 1, line 42, "sports" should be --spots--

Column 3, line 43, "sub-group" should be --subgroup--

Column 4, line 60, delete "and" and substitute --the--

Column 9, line 48, delete ";"

Signed and Sealed this

First Day of July 1980

[SEAL]

Attest:

SIDNEY A. DIAMOND

Attesting Officer

Commissioner of Patents and Trademarks